United States Patent [19]

Treen

[11] 4,048,791
[45] Sept. 20, 1977

[54] REVERSIBLE SICKLE-BAR TYPE LAWN MOWER AND TRIMMER

[76] Inventor: J. Paul Treen, 5025 St. Bernard Ave., New Orleans, La. 70122

[21] Appl. No.: 697,474

[22] Filed: June 18, 1976

[51] Int. Cl.² .............................................. A01D 35/12
[52] U.S. Cl. ........................................ 56/17.6; 56/246
[58] Field of Search ................ 56/17.6, 246, 248, 293, 56/12.9

[56] References Cited

U.S. PATENT DOCUMENTS

| | | | |
|---|---|---|---|
| 1,989,821 | 2/1935 | Peterson | 56/246 |
| 2,654,200 | 10/1953 | Bathurst | 56/17.6 |
| 3,058,286 | 10/1962 | Miller | 56/17.6 |
| 3,254,481 | 6/1966 | Tweedale | 56/12.9 |

Primary Examiner—Russell R. Kinsey
Attorney, Agent, or Firm—Pugh & Keaty, Ltd.

[57] ABSTRACT

A lawn mower of the sickle-bar type having an elongated straight double-edged blade mounted at either end by a planetary mount producing in the horizontal plane a generally laterally reciprocating motion combined with an orbital motion creating cutting forces in both directions with the double-edged blade. The basic support wheels, handle and blade mounting and driving system are so mounted to allow one of the cutting sides or edges of the blade to be used for usual lawn mowing operation, which side is located well within and under and centrally to the basic mower structure, and the other, opposite cutting side to be used for trimming close to walls, trees, etc., which side is located at and moves past the end of the basic mower structure. The handle is reversible from one side to the other to allow the operator to move to and push from the appropriate side, depending on whether mowing or trimming operation is desired. Utilizing only two ground contacting wheels allows the mower to be used for edge trimming in a vertical plane too.

9 Claims, 3 Drawing Figures

REVERSIBLE SICKLE-BAR TYPE LAWN MOWER AND TRIMMER

BACKGROUND OF THE INVENTION

1. Field of the Invention

The present invention relates to a lawn mower of the sickle-bar type in which the blade has a combined reciprocating and orbital motion and can be used for regular mowing as well as for close-in trimming.

2. Prior Art

Most of the motor driven lawn mowers in use today are of the rotating blade type, although sickle-bar type lawnmowers are also known.

The closest known prior art of the sickle-bar type are the following U.S. patents: U.S. Pat. No. 2,654,200 to T. T. Bathurst issued Oct. 6, 1953, U.S. Pat. No. 3,058,286 to K. Miller issued Oct. 16, 1962, U.S. Pat. No. 3,254,481 to R. L. Tweedale issued June 7, 1966.

The Bathurst patent discloses a sickle-bar lawn mower having a relatively massive oscillating blade of great longitudinal depth with both blade sides exposed at the front and rear of the machine. Additionally because of the longitudinal depth and size of the blade, very little if any to-and-fro or longitudinal motion of the blade occurs, producing cutting action in only the lateral direction.

The Miller patent, although representing a significant advance in the field, discloses a power mower in which the blade is single edged, does not protrude past the basic mower structure, and is not reversible.

The Tweedale patent discloses a lawn mower restricted to cutting turf, etc. and utilizes a relatively large cutter plate configured within a housing and a guard plate extending completely across its bottom.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

SUMMARY DISCUSSION OF THE PRESENT INVENTION

The present invention utilizes a double-edge blade bar which is driven with both a reciprocating action in the lateral direction, producing a sliding cut, and an orbital action in the longitudinal direction, producing a to-and-fro cut. The blade bar is mounted so that in most of its travel it is located under the main or basic mower structure but does move past it at one end for close-in trimming action.

In contrast to the rotary blade prior art, the present invention cuts in a straight line instead of a circular one, thereby reducing scalping. In contrast to the sickle-bar lawn mowing art, the present invention combines slicing and chopping action for better cutting.

In its close-in trimming use, the present invention can go right up to an obstacle, for example within a quarter inch thereof, and cuts at that point in a nice straight line.

The present invention also preferably only uses two ground contacting wheels, allowing the mower to do edge trimming in a vertical plane as well, and locates the forward travel of the blade in the mowing disposition at the axis of the ground contacting wheels, preventing scalping when mowing.

Additional advantages and features of the present invention will become more readily apparent after considering the detailed description below. However in general the present invention is faster, quieter, simpler, requires less energy, and should be less expensive to buy and maintain.

DETAILED DESCRIPTION OF THE PREFERRED EMBODIMENT

Figure 1:
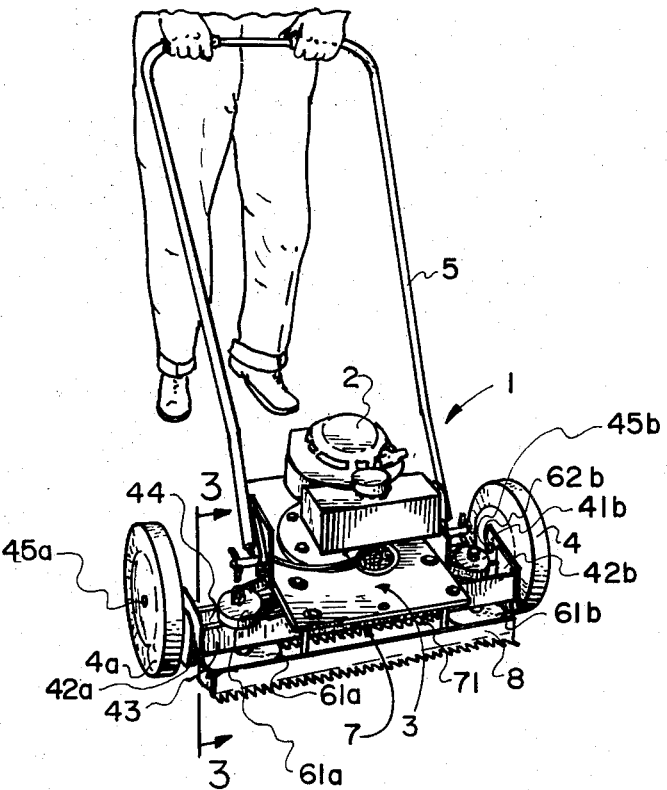
FIG. 1 is a frontal, perspective view of the preferred embodiment of the lawn mower and operator in the close-in trimming disposition.

As shown in FIG. 1, the preferred embodiment of the present invention is directed to a combined lawnmower and trimming machine 1, including a motor 2 mounted on a basic mower support structure 3 which rides on two wheels 4a, 4b. A handle 5, which is reversible as described more fully below, is provided to allow the operator to push and guide the lawnmower 1 over the ground.

Figure 2:
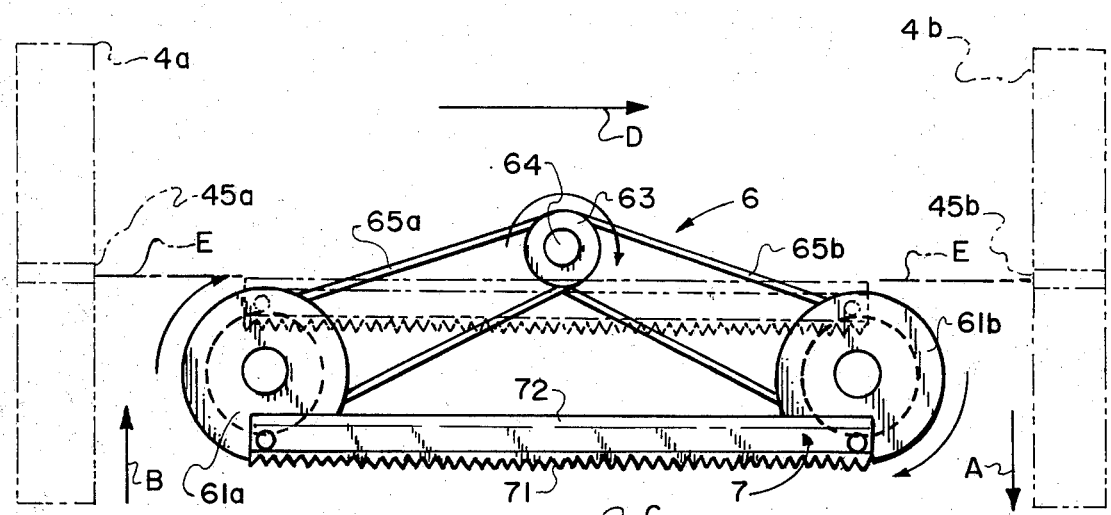
FIG. 2 is a bottom view of the double-edged blade and its orbital mounting and drive systems of the embodiment of FIG. 1.

The motor 2 drives the blade 7 in a combined laterally reciprocating and orbital motion in a horizontal plane by means of the drive and mounting system 6, more clearly illustrated in FIG. 2.

As can best be seen in FIG. 2, the blade 7 is straight and elongated and is double-edged having a serrated cutting edge 71 on one side and a straight cutting edge 72 on its opposite side. The blade is mounted by means of two pins on the peripheral edges of two rotatable mounting wheels 61a and 61b. Note also FIG. 3. The blade mounting wheels 61a, 61b are rotated and driven by motor shaft 64 acting through dual belt drive wheels 63 acting on the mounting wheels 61a, 61b through drive belts 65a and 65b, respectively.

Figure 3:
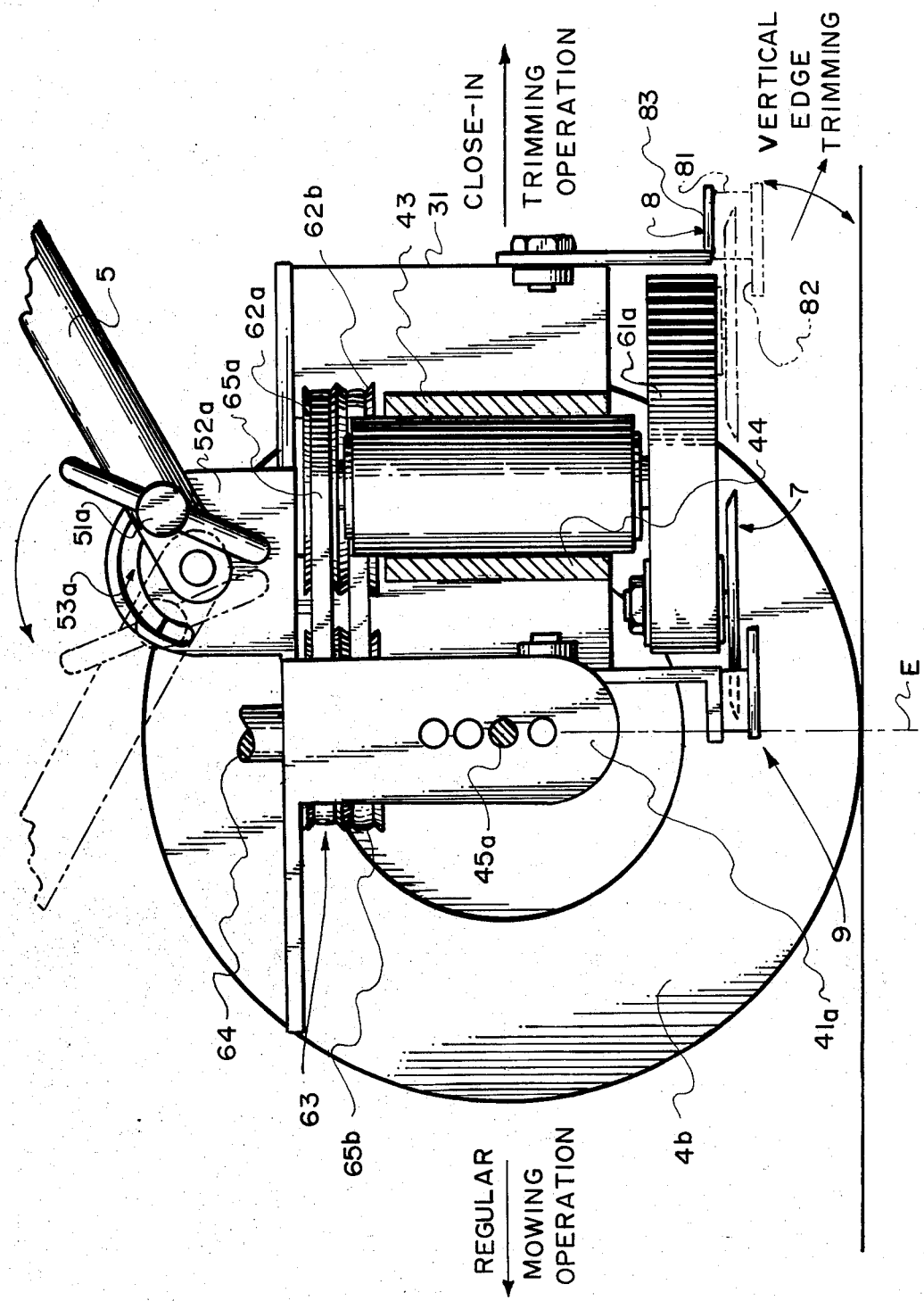
FIG. 3 is a side, cross-sectional view of the embodiment of FIG. 1, taken along staggered section lines 3—3 and the element 42a removed, with the handle in the position for using the embodiment for its usual mowing operation (the other "trimming" position for the handle being shown in phantom line); a further guard accessory on the trimming side of the blade is also shown in phantom line.

As a result of the orbital mounting of the blade 7 on the wheels 61a, 61b, the blade 7 follows a reciprocating motion in the lateral direction combined with an orbital driving of the blade forward and backward in the longitudinal direction, all in a horizontal plane; compare for example the position of the blade 7 illustrated in solid line and phantom line in FIGS. 2 and 3. Both side edges 71, 72 of the blade 7 are sharpened and capable of cutting and do in fact cut both in their forward and backward portions of their orbital, reciprocating motions. In the former the blade bar 7 produces a sliding cut (not direction arrows C & D in FIG. 2), and in the latter produces a chopping cut (note direction arrows A & B). It however should be understood that the combined orbital and reciprocating motions of the blade 7 are actually produced by each point of the blade 7 moving in a circular path.

The basic structure of the lawnmower also includes two lateral support bars 43 and 44 running the width of the machine. At the terminal ends of the bars 43, 44, are structural elements 42a and 42b which in turn carry the wheel supports 41a and 41b for the wheels 4a, 4b, respectively. The wheel mounts 41a, 41b include a series of vertically spaced wheel axle holes (note FIG. 3) for varying the vertical position of the wheels and accordingly varying the position of the blade 7 above the ground level to vary the cutting depths of the blade 7. Lateral support bars 43, 44 hold and support the sleeves carrying the belt pully wheels 61, 62 and their associated shafts.

In normal operation, the lawnmower is driven with the handle 5 in the position shown in solid line in FIG. 3 with the lawnmower being pushed or propelled to the left as viewed from the perspective of FIG. 3, in which case the straight edged side 72 of the blade 7 is doing the cutting in the forward direction. However, whenever it is desired to do some close-in trimming next to an obstacle such as a wall or trees or fences and the like, the handle 5 is moved over to the phantom line position illustrated in FIG. 3, that is to the disposition shown in FIG. 1.

Adjustment of the handle position and the locking thereof in its selected position is achieved in the preferred embodiment by means of the curved slot exemplified by the slot 53a shown in FIG. 3 and a locking wing-nut as exemplified by the wing-nut 51a of FIG. 3. With the lawnmowing machine used in its close-in trimming disposition, the serrated edge 71 of the blade 7 is then in the forward cutting direction (right hand side of FIG. 3). It is noted that the handle 5 can be locked in a straight-up vertical position (not specifically illustrated) when in storage, making it far more compact for storage than most prior art machines. Additionally the slots 53 could be notched at the possible locations and the handle 5 spring loaded to stay in the notches. It is also desirable to have the pivot axis (at element 51) located on the same side of the wheel axis 45 as the blade 7.

As can best be seen in FIG. 3, the location of the wheels 4, the mounting system 6 for the blade 7, and the basic support frame for the machine 3 and its terminal edge 31 are relatively located so that the blade 7 approaches and passes the terminal edge 31 of the frame for close-in triming work, but otherwise is located under and centrally to and within the confines of the basic support structure of the machine 1.

Additionally, the internal longitudinal limit of the blade travel under the machine 1 is preferably located at the mounting axis plane of the ground contacting wheels 4 (note phantom line E of FIGS. 2 & 3, although it is noted that FIG. 3 sjows the forward blade set back a slight amount for purposes of illustrating that exact positioning at phantom line E is not absolutely critical). Thus the forward limit of the straight cutting edge 72 is, in the preferred embodiment, coincidentally or coaxially parallel with the centers 45a, 45b of the wheels 4a, 4b. This insures that the forward, mowing cutting edge 72 is in a plane vertical and fixed to the axis of the support wheels 4 and hence the edge 72 will not scalp on terraces, inclines or drop-offs even when the handle 5 is moved up or down. Thus, moving the handle up and/or down within normal limits has no appreciable effect on the distance of the forward edge of the cutter blade 7 from the ground and consequent height of the cut.

For vertical edging, for example along sidewalks, the machine 1 with the handle 5 in its trimming disposition (FIG. 1) is moved up to the side of the sidewalk, and the handle 5 is raised until the lower edge 82 (shown in phantom line in FIG. 3) of guard 8 touches the sidewalk. The handle 5 is then raised, cutting the grass in a vertical plane and edging alongside the sidewalk. This is repeated without forward motion until the edging is complete. It is noted that the lower guard portion 82 is joined to the upper portion 83 of the guard 8 by means of end supports 81.

Vertical edging can also be achieved by running the lawnmower alongside of and parallel to the edge to be trimmed, with the side or lateral edge of the blade bar 7 being positioned where trimming is desired, the trimming being achieved as the blade 7 moves in the longitudinal direction with its chopping cut. If desired, the vertical position of each wheel 4 could be independently adjustable with one of the many easy adjust mechanical support structures known to those skilled in the art, to enhance vertical edging with this technique.

The guard 8 is serrated or notched to mate generally with the serrations of the blade edge 71. However, the spacing distance of the serrations or notches of the guard 8 and the blade 71 are slightly different so that all the teeth will not be cutting at the same time. For example, for the cutter 71 the separation distances could be five-eights of an inch, while being one-half inch on the guard 8. Also the teeth of the guard are preferably longer, for example a quarter of an inch longer to prevent direct contact of rigid objects (vis-a-vis grass) with the blade 7, and the notches of the guard 8 also preferably extends further inwardly.

The separation distance of the serrations or notches of the guard 8 is chosen so as to prevent entry of undesired items, such as pipes. A further guard 9 can also be included at the inner portion of the blade travel if desired.

The blade 7 could have both of its edges 71, 72 serrated or straight as desired, although the embodiment illustrated is preferred.

The machine of course could be made to be self-propelled if desired. Additionally further guard structures or coverings could be added as desired. In fact the end guards 8 and 9 could be joined together in a continuous structure to offer safety protection along and around the full travel of the blade 7.

The ground contacting wheels 4 could also be mounted so as to be easily movable in the horizontal plane both in a lateral direction and in a longitudinal direction in order to allow greater exposure of the lateral edges of the blae bar 7, which could also have rounded edges.

The above are, of course, merely exemplary of the possible changes or variations. Because many varying and different embodiments may be made within the scope of the inventive concept herein taught and because many modifications may be made in the embodiments herein detailed in accordance with the descriptive requirements of the law, it should be generally understood that the details herein are to be interpreted as illustrative and not in a limiting sense.

I claim:

1. A combined lawn mower and trimmer comprising:
a basic lawn mower support structure;
a cutting blade bar elongated in structure mounted on the underside of said mower support structure;
mounting and drive means connected to said support structure and said blade bar for mounting said blade bar onto said support structure and for driving said blade bar in a combined laterally reciprocating and longitudinally orbital motions in a generally horizontal plane, said blade bar being double-edged, having cutting edges on both of its long edge portions, said blade bar exhibiting a sliding cutting action while it is being laterally reciprocated and a chopping cutting action when it is being orbitally moved in the longitudinal direction;

ground contacting wheel means connected to said support structure for supporting said support structure and said blade bar above the ground; said blade bar in its travel being located at least generally under said support structure and at least generally to one side of said wheel means but extending past said support structure at only one longitudinal end thereof, the opposite end of said support structure extending substantially past said blade bar;

a handle connected to and extending past said basic support structure and being reversibly movable from one of its longitudinal ends to the other, the mower being movable and operational in either longitudinal direction, one for regular mowing and the other for close-in trimming; and guard means positioned about said blade bar at least at the area it extends past said support structure.

2. The mower of claim 1 wherein said wheel means comprises a pair of wheels located on opposite sides of said mower structure whose axes lie in a common vertical plane, the travel of said blade bar being limited to one longitudinal side of said common plane.

3. The mower of claim 1 wherein said mounting and drive means comprises two rotatable elements mounted on opposite sides of the longitudinal center-line of said basic support structure, said blade bar being connected to and across said two rotatable support elements by means of pins off-set and located away from the axes of rotation of said two rotatable elements, said blade bar always being located orthogonally to said longitudinal center line.

4. The mower of claim 3 wherein said blade bar has a serrated cutting edge along its longer side at the longitudinal side it extends past said support structure.

5. The mower of claim 4 wherein the blade side opposite said serrated cutting edge is a straight end.

6. The mower of claim 4 wherein said guard structure is static and includes a serrated portion which at least generally mates with said serrated cutting edge and cooperates therewith for a relatively sliding cutting action, but has a different separation distance for their respective serrations.

7. The mower of claim 2 wherein the axes of said wheel means are located under the center-of-gravity of the mower.

8. The mower of claim 3 wherein said rotatable elements are pulley wheels driven by belts off a common shaft driven by a motor.

9. The mower of claim 2 wherein the longitudinal travel of said blade bar under said support structure terminates at said vertical plane.

* * * * *